US009275676B2

(12) United States Patent
Buch et al.

(10) Patent No.: US 9,275,676 B2
(45) Date of Patent: Mar. 1, 2016

(54) SKEW COMPENSATION IN A PATTERNED MEDIUM

(71) Applicant: Seagate Technology LLC, Cupertino, CA (US)

(72) Inventors: Bruce Buch, Westborough, MA (US); Phillip L. Steiner, Los Altos, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/194,234

(22) Filed: Feb. 28, 2014

(65) Prior Publication Data

US 2015/0248914 A1    Sep. 3, 2015

(51) Int. Cl.
| | |
|---|---|
| G11B 21/02 | (2006.01) |
| G11B 20/12 | (2006.01) |
| G11B 5/09 | (2006.01) |
| G11B 5/74 | (2006.01) |
| G11B 5/012 | (2006.01) |

(52) U.S. Cl.
CPC .............. *G11B 20/1217* (2013.01); *G11B 5/09* (2013.01); *G11B 5/743* (2013.01); *G11B 5/012* (2013.01); *G11B 5/746* (2013.01); *G11B 2020/1242* (2013.01)

(58) Field of Classification Search
None
See application file for complete search history.

(56) References Cited

U.S. PATENT DOCUMENTS

| | | | |
|---|---|---|---|
| 6,746,825 B2 | 6/2004 | Nealey et al. | |
| 6,822,833 B2 | 11/2004 | Yang et al. | |
| 6,893,705 B2 | 5/2005 | Thomas et al. | |
| 7,029,773 B2 | 4/2006 | van de Veerdonk et al. | |
| 7,041,394 B2 | 5/2006 | Weller et al. | |
| 7,344,773 B2 | 3/2008 | Subramanya et al. | |
| 7,351,445 B2 | 4/2008 | Haginoya et al. | |
| 7,416,991 B2 | 8/2008 | Bandic et al. | |
| 7,848,048 B1 * | 12/2010 | Albrecht et al. ................. 360/75 |
| 7,959,975 B2 | 6/2011 | Millward | |
| 8,051,304 B2 | 11/2011 | Takiguchi et al. | |
| 8,133,341 B2 | 3/2012 | Nealey et al. | |
| 8,133,534 B2 | 3/2012 | Stoykovich et al. | |
| 8,158,284 B2 | 4/2012 | Kimura | |
| 8,304,493 B2 | 11/2012 | Millward et al. | |
| 8,824,092 B2 * | 9/2014 | Chauhan et al. ................. 360/76 |
| 2002/0132083 A1 | 9/2002 | Weller et al. | |
| 2003/0091865 A1 | 5/2003 | Chen et al. | |
| 2003/0194582 A1 | 10/2003 | Ishikawa et al. | |
| 2004/0071924 A1 | 4/2004 | Yang et al. | |

(Continued)

FOREIGN PATENT DOCUMENTS

| | | | |
|---|---|---|---|
| JP | 2007-313568 A | 12/2007 |
| JP | 2008-090956 A | 4/2008 |

(Continued)

*Primary Examiner* — K. Wong
(74) *Attorney, Agent, or Firm* — Hall Estill Attorneys at Law

(57) ABSTRACT

Apparatus for providing skew compensation in a patterned medium, such as but not limited to a self-assembling bit patterned medium. In accordance with some embodiments, the apparatus includes a transducer and a rotatable substrate. The substrate has a plurality of rows of spaced apart data recording dots. Each row of dots is angularly offset from an immediately adjacent row responsive to a skew angle of the transducer. The rows of dots are arranged into concentric zones of hypertracks. Each zone has an arcuate timing field segment which extends across the zone and is angularly discontinuous with the timing field segment of an immediately adjacent zone.

20 Claims, 10 Drawing Sheets

(56) References Cited

U.S. PATENT DOCUMENTS

| | | |
|---|---|---|
| 2006/0222898 A1 | 10/2006 | Ichihara |
| 2008/0176749 A1 | 7/2008 | Goyal |
| 2009/0087664 A1 | 4/2009 | Nealey et al. |
| 2009/0196488 A1 | 8/2009 | Nealey et al. |
| 2009/0308837 A1 | 12/2009 | Albrecht et al. |
| 2010/0124638 A1 | 5/2010 | Xiao et al. |
| 2012/0107583 A1 | 5/2012 | Xiao et al. |

FOREIGN PATENT DOCUMENTS

| | | |
|---|---|---|
| JP | 2010-056257 A | 3/2010 |
| WO | 2004001756 A1 | 12/2003 |
| WO | 2006118677 A2 | 11/2006 |

\* cited by examiner

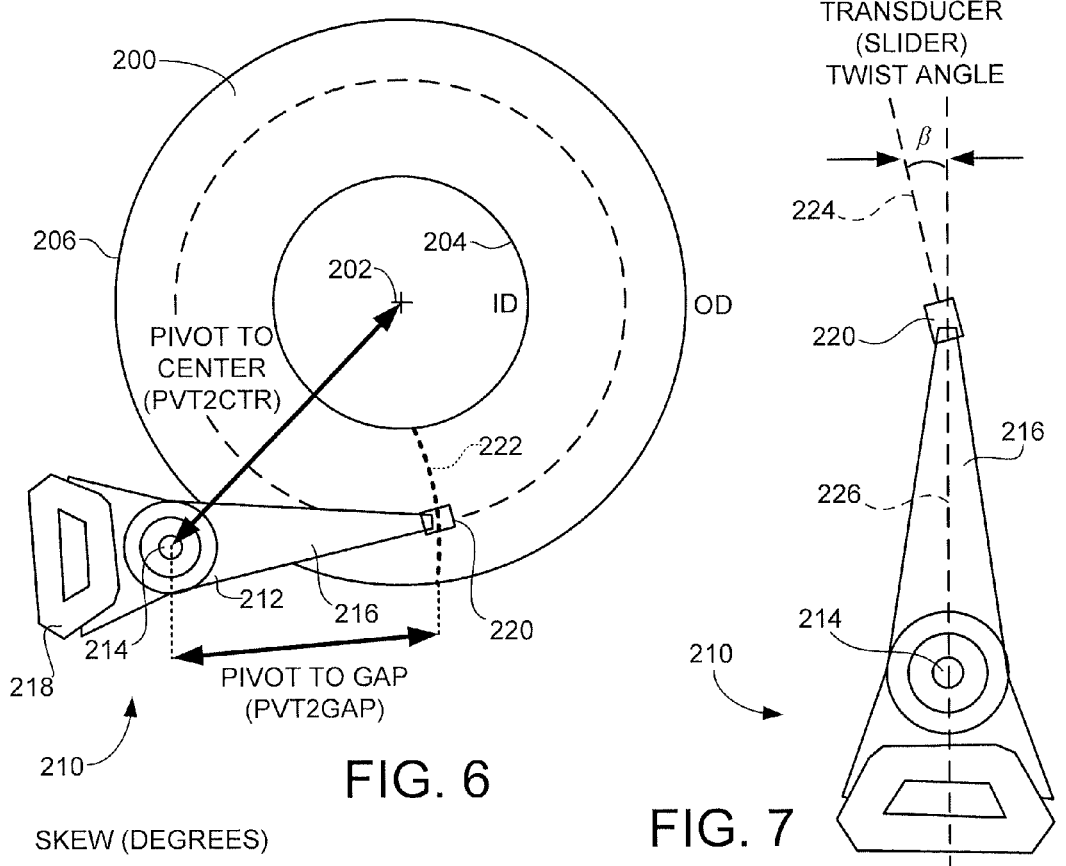
FIG. 6
FIG. 7
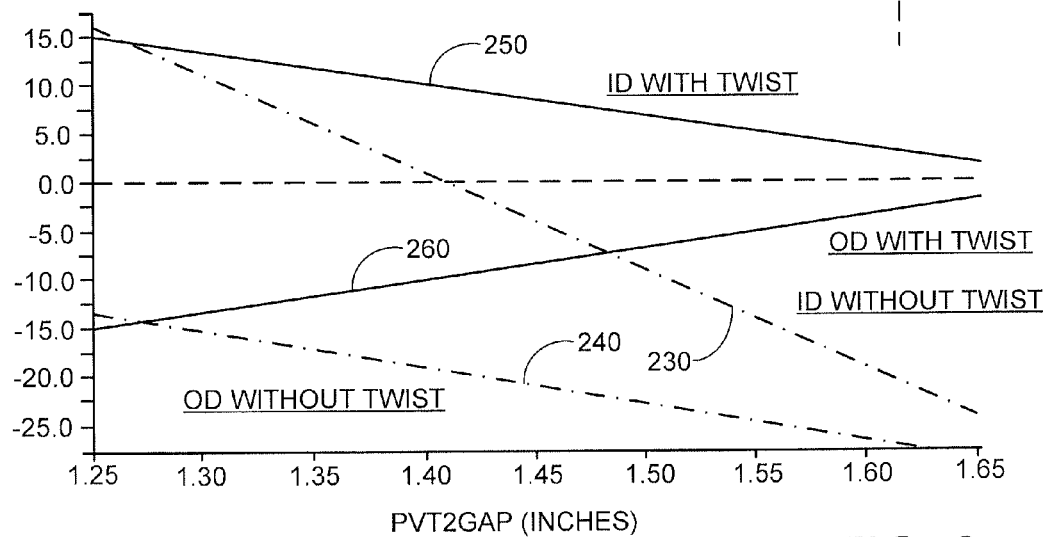
FIG. 8

SKEW COMPENSATION IN A PATTERNED MEDIUM

SUMMARY

Various embodiments of the present disclosure are generally directed to providing skew compensation in a patterned medium, such as but not limited to a self-assembling bit patterned medium.

In some embodiments, the apparatus includes a transducer and a rotatable substrate having a plurality of rows of spaced apart data recording dots, each row of dots angularly offset from an adjacent row responsive to a skew angle of the transducer and arranged into concentric zones, each zone having a timing field segment which extends across the zone and is angularly discontinuous with the timing field segment of an immediately adjacent zone.

In further embodiments, the apparatus has an actuator assembly rotatable about a mechanical pivot point. The actuator has an actuator arm which supports a transducer with respective read and write elements. The transducer is rotationally offset by a twist angle relative to a longitudinal centerline of the actuator arm, with the longitudinal centerline passing through the mechanical pivot point. The twist angle defines a virtual stroke path about a virtual pivot point. A rotatable patterned medium is provided adjacent the actuator assembly and has a plurality of hypertracks arranged into concentric zones. Each hypertrack is formed from at least two immediately adjacent rows of spaced apart data recording dots. Each row of dots is angularly offset from an immediately adjacent row of dots by an amount determined in relation to the twist angle of the transducer and a skew angle of the transducer.

In further embodiments, the apparatus comprises a bit patterned medium having rows of spaced apart data recording dots angularly offset from immediately adjacent rows. The rows of dots are arranged into hypertracks each having at least two rows of dots. The hypertracks in turn are arranged into concentric zones, with each zone having an arcuate timing field segment to provide timing information for writing data to and reading data from the data recording dots. The timing field segments are angularly discontinuous at zone boundaries and arranged to nominally follow a mechanical stroke path of an adjacent transducer.

These and other features and aspects which characterize various embodiments of the present invention can be understood in view of the following detailed discussion and the accompanying drawings.

BRIEF DESCRIPTION OF THE DRAWINGS

FIG. 6 shows an actuator assembly supporting a transducer adjacent a storage medium in accordance with some embodiments.

FIG. 7 illustrates a twist angle applied to the transducer in FIG. 6.

FIG. 8 is a graphical representation of skew versus actuator arm length both with and without the application of a twist angle to the transducer of FIGS. 6-7.

DETAILED DESCRIPTION

Figure 1:
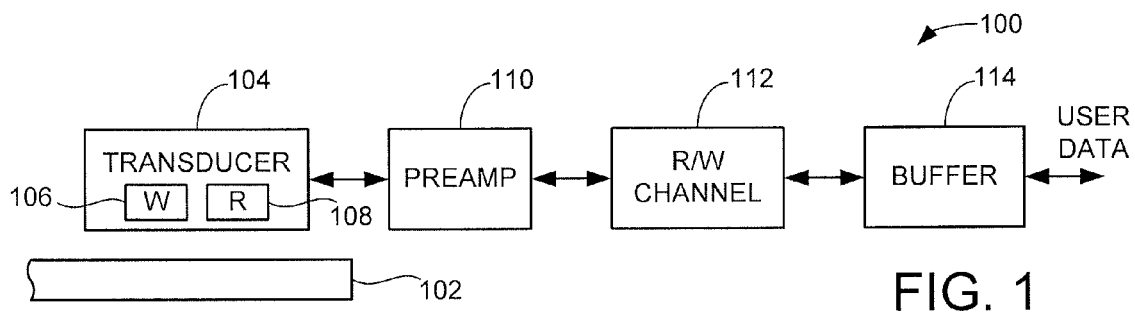
FIG. 1 provides is a functional block representation of a data storage and recovery system which operates in accordance with various embodiments of the present disclosure.

Digital data may be stored and retrieved in a variety of ways. A patterned medium (also "bit patterned medium" or "BPM") is a type of rotatable data storage memory that uses a sequence of magnetic regions surrounded by non-magnetic material. The magnetic regions, sometimes referred to as "bits," "bit islands" or "data recording dots," store data in the form of recorded magnetic domains.

The magnetization of the dots can be established by a write element which applies a synchronized magnetic field of variable direction to the dots as the dots pass adjacent the element. The stored data can be subsequently recovered using a read sensor to sense the magnetization pattern of the dots as the dots pass adjacent the sensor, and a data recovery channel which decodes the originally written data sequence from a readback signal output by the read sensor.

In some forms of patterned media, data are written in the form of tracks on a rotatable disc surface, with each track comprising a circumferentially extending sequence of dots at a given radius. Non-magnetic material surrounds each dot to magnetically isolate the dot and enable the dot to retain a written magnetic orientation. While the dots are often circular in shape, other shapes can be used including elongated, rectilinear, cylindrical, etc.

Each track may be formed of two or more subtracks (e.g. rows) of dots. The dots in the subtracks may be staggered or angularly aligned. In some cases, a track having multiple rows of data recording dots may be referred to as a "hypertrack." When two subtracks of dots are provided in each hypertrack, it is common to refer to one of the subtracks as an "even" subtrack or row, and to refer to the other one of the subtracks as an "odd" subtrack or row.

A rotatable transducer may be used to respectively position the read and write elements adjacent the respective hypertracks. Because the transducer follows a mechanical arc of motion (mechanical stroke path), the transducer may be skewed with respect to the media at different radial locations of the medium. This can result in non-uniform presentation of the dots to the write element and the read sensor.

Accordingly, various embodiments of the present disclosure are generally directed to storing data using patterned media with hypertracks while addressing these and other limitations of the related art. As explained below, at least some of the various embodiments disclosed herein have been developed based on the following findings and analysis by the inventors.

First, in order to have nominally uniform even/odd bit intervals, the two staggered rows of dots that comprise a hypertrack should generally be patterned with a downtrack offset relative to each other that compensates for the skew of the reader at that track position. At the same time, methods of BPM self-assembly limit how much a hypertrack pattern can deviate from a pure hexagonal (or other) geometry, and thus limit the amount of reader skew that can be compensated by downtrack offset within the rows of a hypertrack.

Keeping the skew within these patternable limits has been found to require a mechanical configuration where the actuator is lengthened to reduce the range of skew. Lengthening the actuator reduces the range of skew, but can tend to bias the range in one direction. An angular offset ("twist" as used herein) in the axis of the reader and writer elements can be used to compensate for this bias, resulting in substantially symmetry (close to zero degrees of skew) across the actuator stroke path. Finally, constraints of the BPM self-assembly process generally result in adjacent rows of adjacent hypertracks having the same relative downtrack offset as rows within a hypertrack.

Disclosed embodiments take into account the combined effects of each of the foregoing points by providing a pattern where corresponding bits of adjacent tracks are placed along a "virtual arc" (also "virtual stroke") having a different center than the center of the arc that defines the stroke of mechanical movement of the head (the so called "mechanical arc" or "mechanical stroke"). This center can be placed at the intersection of normals to line segments drawn across corresponding bit positions of the two rows of a hypertrack.

Radially coherent servo fields used to provide servo positioning information are nominally aligned along the mechanical stroke of the actuator. Radially coherent timing fields (e.g., "iPLL" or "interspersed phase lock loop" fields) that provide timing information to the system during writing and reading operations also extend across the medium, but generally need to be phase-coherent to the data dots in the hypertracks, and thus are generally aligned along the virtual stroke of the actuator.

For various operational reasons, including avoiding collisions between servo fields and iPPL fields, at a macro level the servo and iPPL timing fields generally follow the same arc path, which conflicts with the respective requirements of aligning the servo data to the mechanical stroke and aligning the timing fields to the virtual stroke.

Accordingly, as set forth herein, in at least some embodiments the servo fields are arranged on the medium so as to be aligned with the mechanical stroke of the actuator. The hypertracks are arranged into a plurality of concentric zones of tracks, and within each zone, the timing fields are arranged along arcs having the same radius and center as the virtual arcs that define the cross-track alignment of skew-compensated hypertracks.

The collection of individual zone-width segments of the timing fields in each zone thus generally follow an arc parallel to the arc of mechanical stroke. In other words, various embodiments provide a timing field format that provides a "stair-case" arrangement of disjoint timing field arc segments, each timing field arc segment having a larger radius defined by the virtual pivot point, and the timing field arc segments aligned to follow the smaller radius of the mechanical pivot.

This arrangement generally operates to preserve phase-coherence of the timing (e.g., iPPL) fields to the skew compensated data patterns within a zone, prevents collisions between the servo data and the timing fields, preserves a sufficiently-constant delay from the servo fields to the timing fields, and provides timing fields that are disjoint at zone boundaries. However, having disjoint timing fields at zone boundaries does not significantly affect system performance if different constant write/read frequencies are used in each zone per conventional zone based recording (ZBR) techniques.

Accordingly, the various embodiments presented herein provide a rotatable substrate having a plurality of rows of spaced apart data recording dots to form hypertracks arranged into concentric zones. A transducer is provided adjacent the substrate with respective write and read elements. In at least some of the zones, each row of dots is offset from an adjacent row in response to an angle of the transducer when positioned over that row.

In some embodiments, spaced-apart servo patterns extend nearly radially across the substrate and are arranged to follow a mechanical stroke of the transducer established by a pivot point about which the transducer rotates. Each of the zones of hypertracks has at least one data timing field that spans the associated zone and is discontinuous with the timing fields in adjacent zones. The timing fields are phase coherent with the rows of dots and are substantially aligned with the servo patterns.

In further embodiments, the substrate is a self-assembling bit patterned medium (BPM) in which a copolymer or other self-assembly material forms individual dots using an array of alignment features written to the substrate.

In this way, the timing fields within each zone are formatted along arc segments having a center at a virtual pivot different than the mechanical pivot, and having a radius larger than the mechanical pivot-to-gap length. The arc segments that comprise the timing fields that are continuous within a zone are discontinuous with the arc segments of timing fields of adjacent zones. The ensemble of these discontiguous individual arc segments form a piecewise arc having a center at the mechanical pivot.

These and other features of various embodiments can be understood beginning with a review of FIG. 1 which provides a functional block representation of a data storage and recovery system 100 in accordance with some embodiments. For purposes of providing a concrete example, the system 100 is contemplated as forming a portion of a data storage device that employs a patterned medium to store and retrieve user data.

The system 100 includes a patterned medium 102 which is rotated at a selected rotational velocity by a spindle motor (not shown). A transducer 104 is controllably positioned adjacent the medium 102 using a closed loop servo system (not separately shown). The transducer 104 includes a write element 106 adapted to write data to tracks defined on the medium 102, and a read element (sensor) 108 adapted to subsequently generate a readback signal as the transducer 104 passes adjacent the tracks.

The system 100 further includes a preamplifier/driver (preamp) 110, a read/write (R/W) channel 112 and a data buffer 114. Other elements may be included as well but are omitted from the figure such as a top level controller, a closed loop servo control system, etc.

During a write operation, user data received from a host are temporarily stored in the buffer 114, encoded and serialized by the channel 112, and passed to the preamp 110. The preamp applies time-varying write currents to the write element 106 to write a corresponding bit sequence to the medium 102.

During a subsequent read operation, the read element 108 transduces a read signal from the magnetization pattern of the bit sequence. The preamp 110 conditions the readback signal by applying signal normalization and amplification, and the channel 112 applies decoding to recover the originally stored user data. The recovered user data are temporarily stored in the buffer 114 pending transfer to the host.

Figure 2A:
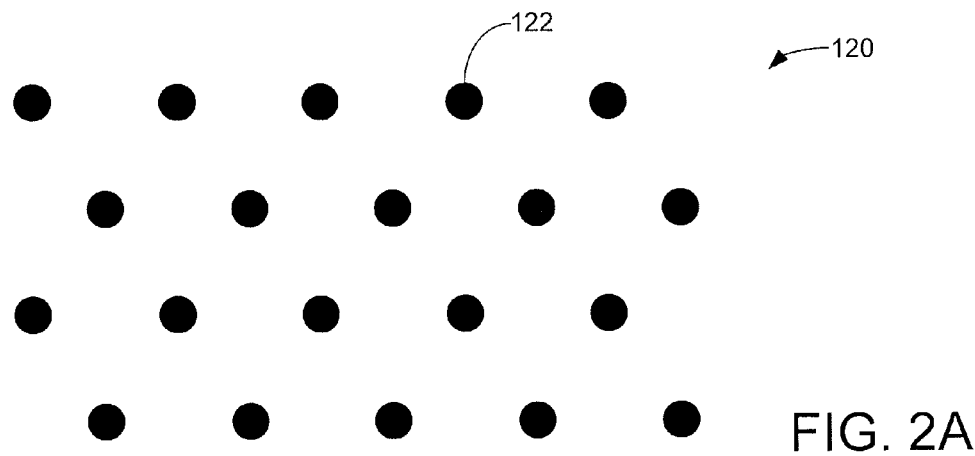
FIGS. 2A-2B depict a self-assembling bit patterned medium (BPM) that can be used in the system of FIG. 1 in accordance with some embodiments.
Figure 2B:
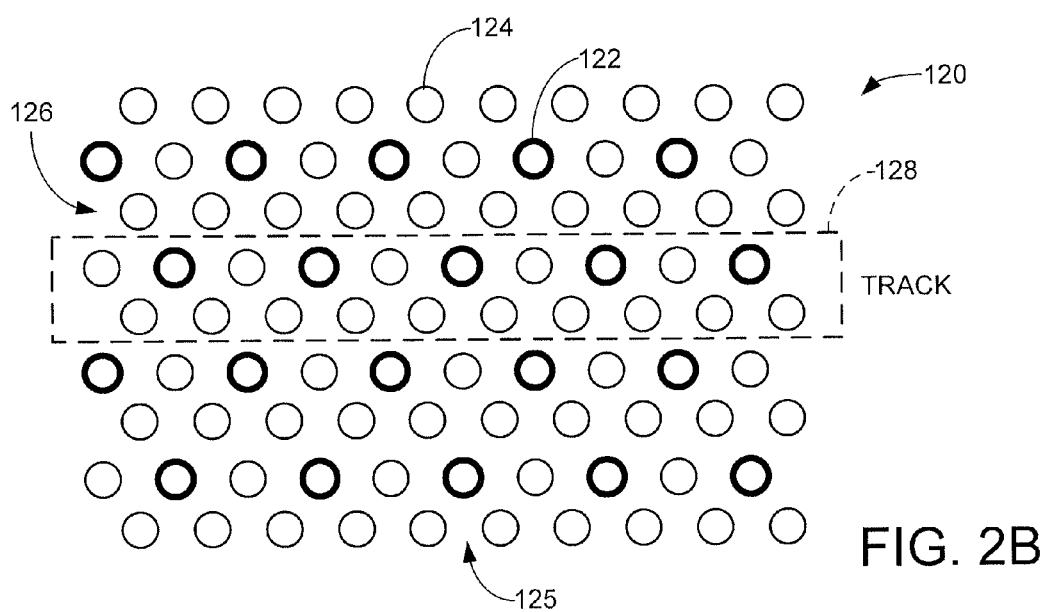

FIGS. 2A-2B provide an example format for a medium 120 useful in the system 100 of FIG. 1. The medium 120 is characterized as a self-assembled bit pattern medium. FIG. 2A shows an array of alignment features 122 in a spaced apart relation on a substrate of the medium 120. The alignment features 122 are written using a suitable lithographic process. The alignment feature pattern may be hexagonal or some other arrangement.

A layer of self-assembling material is applied to the substrate. An activation process that supplies energy to the substrate through the application of heat and/or a chemical treatment causes the material to self-assemble into a series of spaced apart data recording dots 124, as depicted in FIG. 2B. The alignment features 122 guide the final alignment of the data recording dots 124. The self-assembling material can take a variety of forms, such as a copolymer with components that are respectively chemically attracted to/repelled by the alignment features. The dots 124 can take a variety of geometric shapes such as spheres, cylinders, etc.

The dots 124 are formed on top of each of the alignment features 122, as well as between adjacent pairs of the features 122. The dots 124 may be larger than, smaller than or nominally the same size as the alignment features 122. The dots 124 may take the same shape as, or a different shape from, the alignment features 122. While only a single dot 124 is shown between each adjacent pair of features 122, multiple dots can be formed between adjacent features. In some cases, from two (2) to ten (10) dots or more are formed between adjacent alignment features depending upon a number of factors such as the arrangement of the features, the composition of the self-assembling material, etc.

The dots 124 comprise localized regions of magnetizable material suitable for the storage of data. A contiguous layer of non-magnetic material 125 surrounds the dots 124 to magnetically isolate the individual dots. The dots 124 are generally arranged into circumferentially extending, concentric rows 126. In some embodiments, each pair of rows 126 forms a track (hypertrack) 128. Any number of rows can be used to form tracks. Hypertracks made up of two rows will be understood as including an "even" row and an "odd" row of dots. It will be understood that the self-assembly process can be applied directly to each recording medium, or can be applied to a template which is then transferred to individual recording media.

At this point it will be noted that arcs of concentric circular tracks, when viewed at a scale where the field of view is very small compared to the radii of the arcs, resemble parallel lines. Correspondingly, the figures presented herein depicting features at such scale are drawn with the recording dots of adjacent tracks along parallel lines, and to simplify descriptions, the text herein refer to "rows" of dots, which, in reality, are actually concentric arc segments.

Figure 3:
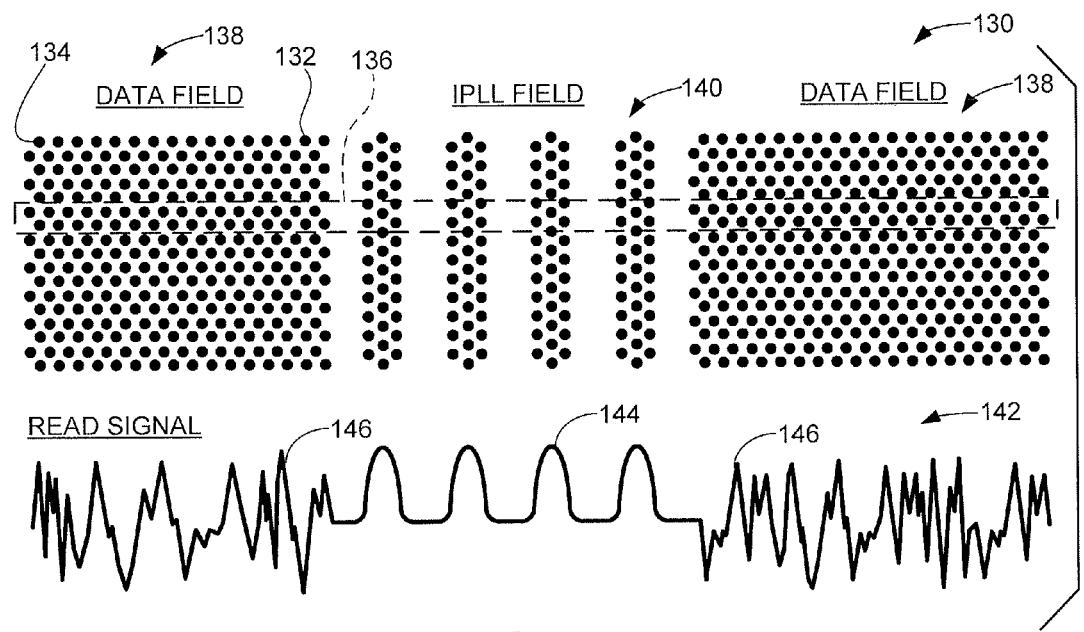
FIG. 3 depicts data fields and timing (e.g., interspersed phase lock loop, or IPLL) fields on a storage medium and an example read signal obtained therefrom.

FIG. 3 illustrates a portion of a medium 130 in accordance with further embodiments. The medium 130 may be a self-assembled bit patterned medium as in FIGS. 2A-2B, although such is not necessarily required. The medium 130 includes a number of data recording dots 132 arranged into rows 134, with each adjacent pair of rows 134 forming a track 136.

The tracks 136 are arranged as a series of data fields 138 interspersed with timing fields 140, such as interspersed phase lock loop (IPPL) fields. The timing fields 140 are inserted along the lengths of the tracks 136 at regular intervals. The number of timing fields 140 per track can vary, such as from a few fields per track to several hundred or more fields per track. In some cases, the number of timing fields 140 may be a multiple of the number of embedded servo data fields (not shown in FIG. 3).

As shown by an example read signal 142 in FIG. 3, the timing fields 140 provide an oscillating pattern with regularly occurring pulses 144 to enable the system 100 to lock onto the individual dots 132 and facilitate recovery of the stored data in the data fields 138, as represented by data readback portions 146 in the read signal 142. Both the IPPL pattern and corresponding signal can take any number of forms. The regular occurrence of the timing fields 140 allow the system 100 (FIG. 1) to maintain temporal synchronicity with the individual dots 132 along the track 136.

Figure 4A:
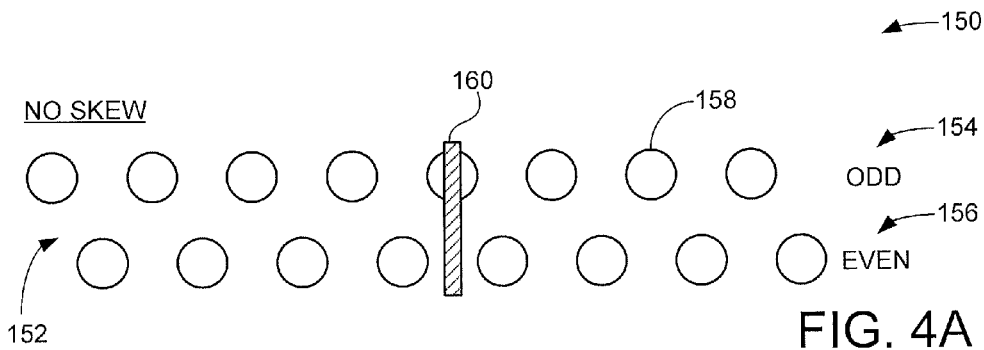
FIGS. 4A-4B depict a hypertrack from FIG. 3 with different amounts of skew applied to a read element of the transducer of FIG. 1.
Figure 4B:
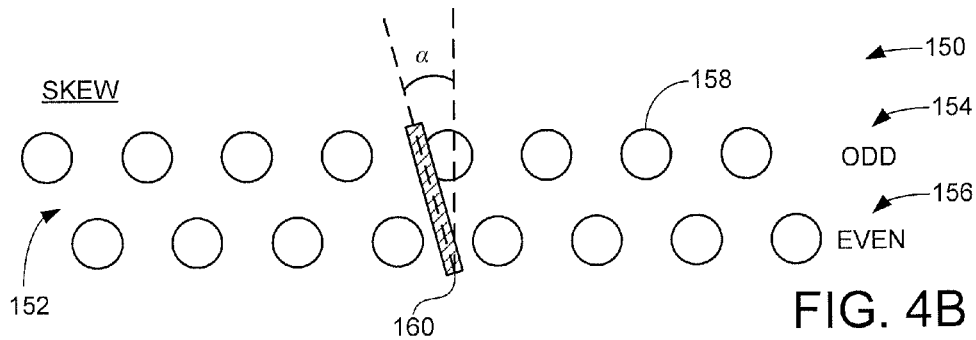

FIGS. 4A and 4B show another medium 150 similar to the media discussed above. A single track is represented at 152, although it will be appreciated that numerous additional tracks are provided adjacent the depicted track. The track 152 is formed from a first subtrack 154 and a second subtrack 156. The respective subtracks 154 and 156 are respectively denoted as an "even" subtrack and an "odd" subtrack, and are each made up of rows of spaced apart dots 158. The dots 158 are evenly spaced so that each dot in the odd subtrack 154 is located between two adjacent dots in the even subtrack 156, and vice versa. While not limiting, individual bits in an input write sequence are written to individual dots so that the written sequence alternates between the odd subtracks 154 and even subtracks 156.

A transducer 160 is hydrodynamically supported adjacent the rotating medium 150. The transducer 160 has a read sensor width (represented by the cross-hatched rectangular area depicted in the figure) that is sufficient to nominally detect the magnetization of both subtracks 154 and 156. In the centered and non-skewed arrangement of FIG. 4A, readback pulses will be alternatively detected as each dot 158 passes adjacent the read transducer 160 in turn.

FIG. 4B illustrates the same pattern of dots as in FIG. 4B, but presents a skewed relationship between the transducer 160 and the track 152. The skew arises from a variety of factors including the use of a rotary actuator that presents the sensing element of the read transducer 160 at different respective angles relative to the tracks. As used herein, the term skew will be understood as a deviation angle $\alpha$ of the transducer away from an orientation that is perpendicular to the circumferential direction of the track.

It can be seen that the transducer 160 in FIG. 4A has nominally no skew ($\alpha=0°$), and the transducer 160 in FIG. 4B has some amount of positive skew (e.g., $\alpha=15°$). In practice, the amount of skew may be related to radial position so that tracks in a middle portion of the medium 150 have nominally no skew, tracks near the innermost diameter (ID) have some amount of positive skew, and tracks near the outermost diameter (OD) have some amount of negative skew. Non-zero skew tends to introduce heightened levels of intersymbol interference (ISI) as well as other deleterious effects due to the non-uniform presentation of the dots 158 to the transducer.

Figure 5:
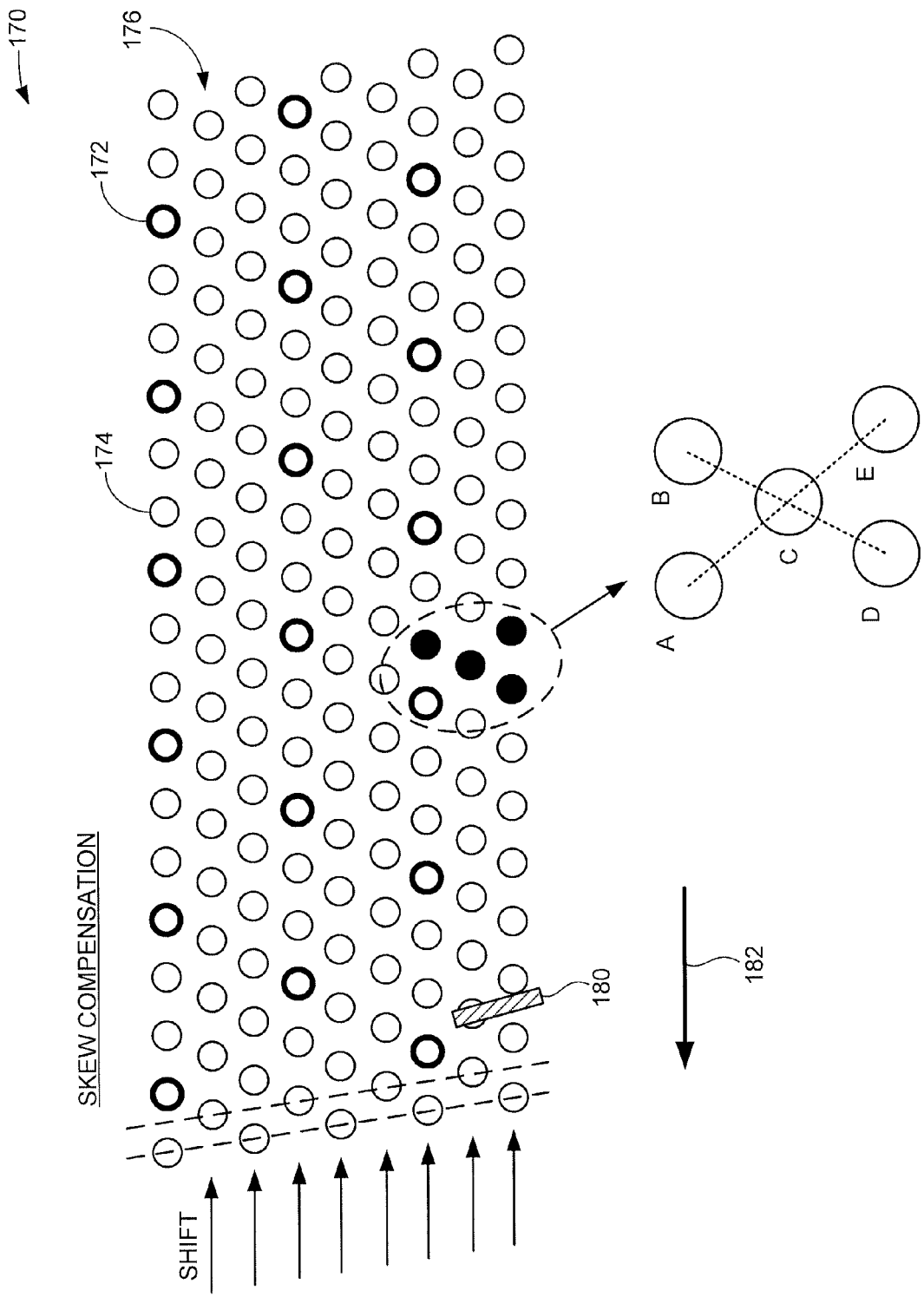
FIG. 5 depicts a storage medium arrangement with shifted rows of data recording dots to compensate for skew as in FIG. 4B in accordance with some embodiments.

FIG. 5 illustrates yet another medium 170 formed in accordance with some embodiments. The medium 170 is characterized as a self-assembling bit patterned medium (BPM), although such is merely exemplary and not limiting. The medium 170 includes alignment features 172 which direct the formation of individual data recording dots 174 along rows 176. The pattern of alignment features 172 provides two (2) dots 174 between each pair of alignment features. As before, different feature arrangements and dot distributions may be used. Multiple rows 176 of the dots 174 may be combined to form tracks (not separately denoted).

Skew compensation is applied to the pattern in FIG. 5 by shifting each row 176 of the dots 174 with respect to the immediately preceding row. In the case of self-assembling media, this can be carried out by providing an offset arrangement within the alignment features 172 which direct the arrangement of offset rows of dots as depicted in FIG. 5. For a subgroup of dots labeled A-E, it can be seen that while the distance A-E is not exactly the same as distance BD, the intermediary dot C will tend to be equidistant from the surrounding dots A through D. Thus, introducing offsets to the alignment feature pattern can introduce corresponding offsets into the rows of dots. For other forms of patterned media, such as printed media, the lithographic or other processing used to form the media can introduce the desired amounts of offset directly to the media.

FIG. 5 further shows a read transducer 180 similar to the transducer 160 in FIGS. 4A-4B. Movement of the medium 170 relative to the transducer 180 is depicted by arrow 182. The transducer 180 has a selected amount of skew as a result of the rotational path taken by the transducer relative to the medium 170. The depicted amount of skew by the transducer 180 is on the order of about +10 degrees (e.g., $\alpha=10°$), although other amounts of skew, including negative skew, can be compensated by this technique.

The rows 176 have been shifted along the direction of the tracks in an amount to nominally correspond to the amount of skew in the transducer 180. This allows the respective rows of dots 172 to reach the transducer in a uniform time sequence manner, as in FIG. 4A. Although the odd subtrack dots in a given track are not physically centered with respect to the even subtrack dots, the dots will nevertheless be presented to the transducer 180 at a uniform rate. Rows 176 at different radial locations on the medium 170 can be shifted by different amounts to account for changes in the amount of skew in the transducer 180. For example, if the dots 172 in FIG. 5 are located near the outermost diameter (OD) of the medium 170, similar amounts of shifting in the opposite direction may be applied for rows of dots near the innermost diameter (ID) of the medium.

FIG. 6 depicts another rotatable medium 200 in accordance with some embodiments. The medium 200 is a patterned medium similar to the media discussed above, and is configured to rotate about a central axis 202 using a spindle motor (not shown). The medium 200 is bounded by a circumferentially extending inner sidewall 204 adjacent the ID of the medium, and a circumferentially extending outer sidewall 206 adjacent the OD of the medium.

A rotatable actuator 210 is positioned adjacent the medium 200. The actuator 210 has a main body portion 212 that pivots about a mechanical pivot point 214. An actuator arm 216 extends from the main body portion 212 toward the medium 200, and a voice coil 218 is supported by the main body portion 212 opposite the actuator arm 216. The actuator arm 216 (which may include both rigid and flexure sections) terminates at a transducer 220 having associated read and write elements (not separately shown).

Two primary distances are denoted in FIG. 6. The distance PVT2CTR ("pivot to center") denotes the overall distance from the rotational center 202 of the medium 200 to the center of the actuator pivot point 214. The distance PVT2GAP ("pivot to gap") denotes the overall distance from the center of the actuator pivot point 214 to the read and write elements of the transducer 220.

FIG. 6 further shows a mechanical stroke path 222 of the transducer 220. The mechanical stroke path is a curvilinear path along which the read and write elements of the transducer 220 are nominally directed during rotation of the actuator 210 about the pivot point 214. The path 222 can be a midpoint of the transducer 220 between the respective read and write elements, or can represent the path of a selected one of the elements (e.g., the read sensor).

FIG. 7 provides an enlarged view of the actuator 210 from FIG. 6. A twist angle $\beta$ is applied to the transducer 220 so that the transducer is canted (rotated) with respect to the actuator arm 216. The twist angle $\beta$ is provided between a centerline 224 of the transducer and a centerline 226 of the actuator arm 216. While not necessarily required, the application of a twist angle to the transducer (slider) can decrease the amount of skew across the radius of the medium, as explained below. While any number of suitable twist angles can be applied, the example twist angle in FIG. 7 is on the order of about 20 degrees (e.g., $\beta=20°$).

FIG. 8 graphically illustrates the skew angle $\alpha$ that can be achieved for various actuators using different actuator arm lengths (e.g., PVT2GAP distances) and twist angles $\beta$ for a mechanical configuration with PVT2CNTR of about 1.5 inches, inner radius of about 0.56 inches and outer radius of about 1.2 inches. A first set of curves 230, 240 depict a first actuator in which the centerline of the transducer nominally aligns with the centerline of the actuator arm (e.g., a twist angle $\beta=0°$). Curve 230 represents the skew experienced adjacent the ID of the adjacent medium, and curve 240 is the skew experienced adjacent the OD of the medium.

For shorter actuator arm lengths, the skew a for the first actuator is somewhat centered about 0 degrees. Using a PVT2GAP of about 1.25 inches, the skew at the ID is about +16 degrees ($\alpha=16°$), the skew at the OD is about −14 degrees ($\alpha=-14°$), and the skew in the middle of the medium is nominally 0 degrees ($\alpha=0°$).

Lengthening the actuator arm of the first actuator reduces the overall range of skew from ID to OD, but also shifts all of the skew in the negative direction. For example, FIG. 8 shows that increasing the actuator arm length PVT2GAP to about 1.5 inches provides a skew at the ID of about −9 degrees ($\alpha=-9°$, a skew at the OD of about −23 degrees ($\alpha=-23°$), and a skew in the middle of the medium of around −16 degrees ($\alpha=-16°$)

Curves 250 and 260 correspond to a second actuator to which a non-zero twist angle has been applied, such as in FIG. 7. Curve 250 corresponds to skew at the ID and curve 260 corresponds to skew at the OD. The twist angle enables the actuator arm to be lengthened without shifting the overall skew range. For example, a shorter arm length PVT2GAP of about 1.25 inches provides skew of about +15 degrees ($\alpha=15°$) adjacent the ID, about −15 degrees ($\alpha=-15°$) adjacent the OD, and about 0 degrees ($\alpha=0°$) for a midpoint between the ID and the OD. A longer arm length PVT2GAP of about 1.65 inches provides skews of about ±4 degrees ($\alpha=\pm4°$) at the respective ID and OD, and zero skew ($\alpha=0°$) at midpoint locations of the media.

The application of the transducer twist angle can thus significantly reduce the amount of skew along the mechanical stroke path 222. The twist angle $\beta$ applied to the transducer 220 in this exemplary configuration is about 22.4 degrees ($\beta$=22.4°). These respective values are merely exemplary, as different values may be used for different applications and environments.

Figure 9:
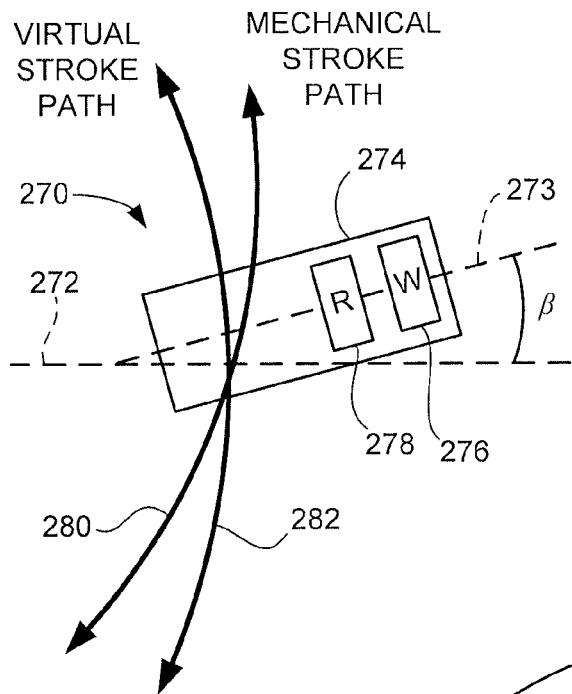
FIG. 9 is a transducer to which a twist angle has been applied in accordance with some embodiments.

While the introduction of twist to the transducer tends to reduce mechanical skew, it also tends to introduce virtual skew into the system. FIG. 9 is a simplified non-scaled representation of a transducer 270 to which a twist angle $\beta$ of about 20 degrees ($\beta$=20°) has been applied with respect to an actuator arm longitudinal centerline (dotted line 272). It will be noted that the longitudinal centerline passes through a rotational pivot point of the actuator arm, and the twist angle generally corresponds to the rotational offset between the longitudinal centerline of the actuator arm and the longitudinal centerline (line 273) of the transducer 270.

The transducer 270 has a slider 274 which supports a write element 276 and a read sensor 278 adjacent a trailing edge of the slider. Line 280 represents the mechanical stroke path of the transducer 270 as the transducer is rotated about the pivot point at the opposite end of the actuator arm centerline. Line 282 represents a virtual stroke path of the transducer.

Figure 10:
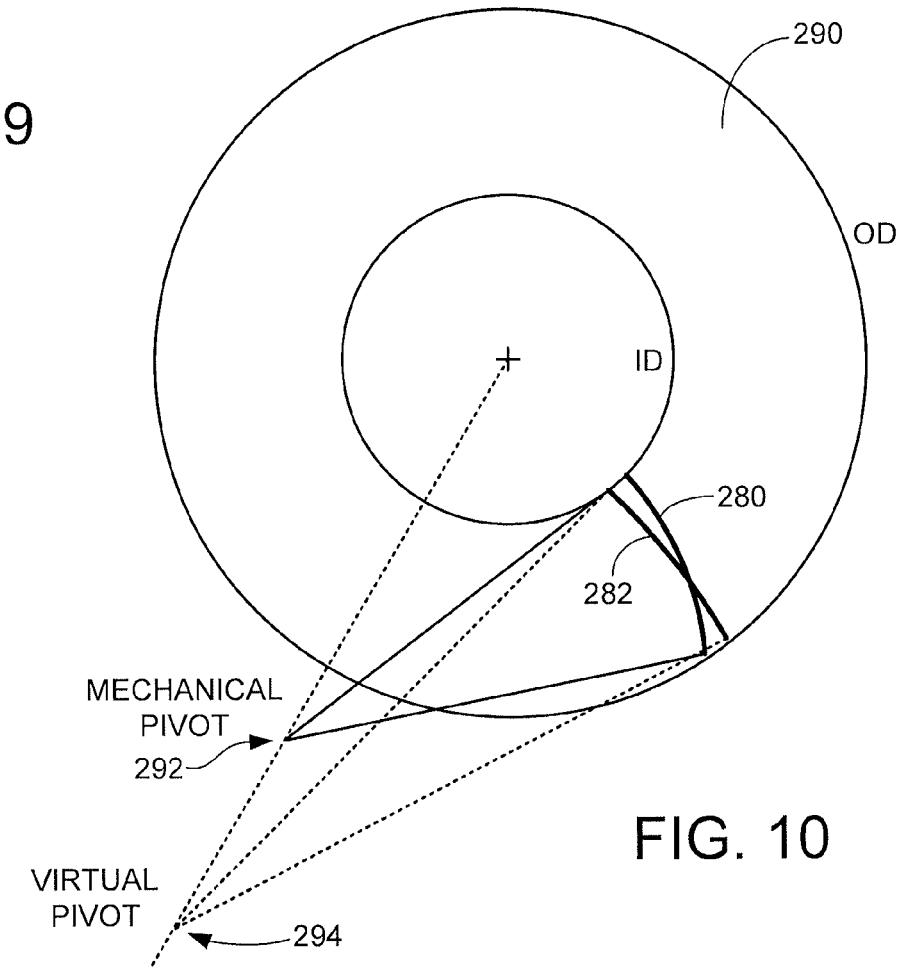
FIG. 10 depicts respective mechanical and virtual stroke paths and associated pivots for the transducer from FIG. 9.

FIG. 10 shows a rotatable medium 290 in conjunction with the mechanical and virtual stroke paths 280, 282 of FIG. 9. A mechanical pivot point 292 represents the center of the actuator pivot about which the transducer 270 (FIG. 9) rotates to follow the mechanical stroke path 280. A virtual pivot point 294 represents the center of a virtual pivot for the actuator that would cause the write element 276 and read sensor 278 to move along the virtual pivot path 282. For clarity, the mechanical pivot 292 represents the actual pivot point of the actuator and corresponds to the pivot point 214 discussed above in FIG. 6. The virtual pivot 294 is not an actual pivot, but rather is a conceptual pivot induced by the twist angle $\beta$ applied to the slider 274 (FIG. 9).

Figure 11:
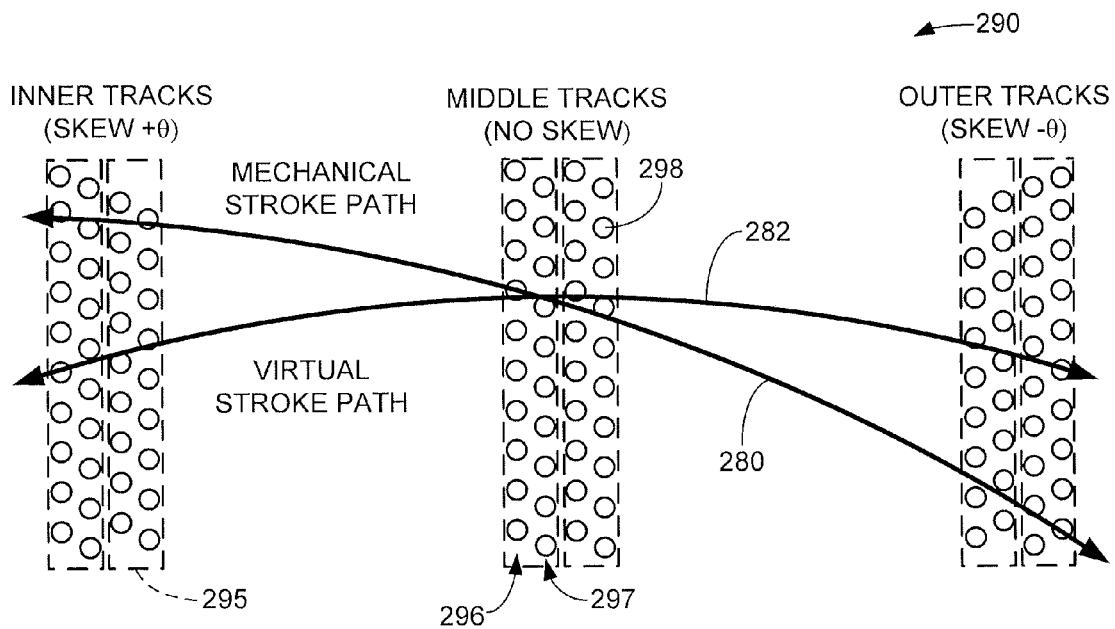
FIG. 11 shows tracks at different locations on the medium of FIG. 10.

FIG. 11 shows portions of the medium 290 in conjunction with the mechanical and virtual stroke paths 280, 282. The medium 290 has a number of tracks 295 made up of rows (even and odd subtracks) 296, 297 of spaced-apart dots 298. The inner, middle and outer tracks depicted in FIG. 11 are located adjacent the ID, the OD and the middle portion of the medium 200, respectively.

The mechanical stroke path 280 provides an actual skew of about ±4 degrees ($\alpha$=±4°) from ID to OD with respect to the transducer. The virtual stroke path 282 provides a corresponding virtual skew of the write element 276 and read sensor 278 (FIG. 11) across the same radial extent. The subtracks 296, 297 in each track 295 are respectively offset as required to nominally match the virtual stroke path 282. In this way, the write element 276 and read sensor 278 will pass adjacent the various tracks 295 in such a way that the dots 298 in the respective even and odd subtracks 296, 297 will be uniformly presented to the respective write element and read sensor.

It will be recalled that interspersed timing fields (e.g., IPPL fields as in FIG. 3) are used to establish the clock phase necessary for media-synchronous writing and reading. For this reason, the IPPL fields may be arranged to generally have a fixed phase relative to the surrounding data fields. For middle portions of a medium to which essentially no shifting of the rows of dots has been applied, the timing fields and associated data fields will normally be configured as shown in FIG. 3. However, for portions of the medium adjacent the ID or the OD where shifting has been applied to the respective rows of dots, the timing fields will be shifted as well. This can potentially result in sensitivity to cross-track position information provided by servo data, which are usually written along the mechanical stroke path.

Figure 12:
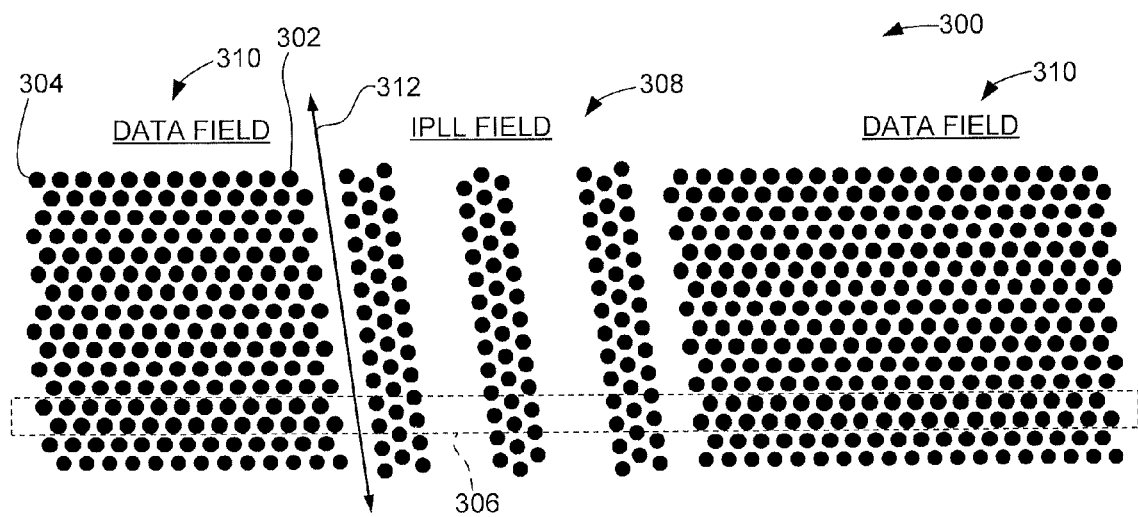
FIG. 12 shows a dot pattern for data fields and a timing field for another medium in accordance with various embodiments.

To illustrate this, FIG. 12 depicts a portion of another patterned medium 300 having dots 302 arranged into shifted rows 304. Pairs of rows 304 form tracks 306, as before. A timing field (IPPL field) is depicted at 308, and data fields are depicted at 310. The timing field 308 is phase coherent with the data fields 310, and both are generally aligned along a virtual stroke path 312.

Figure 13:
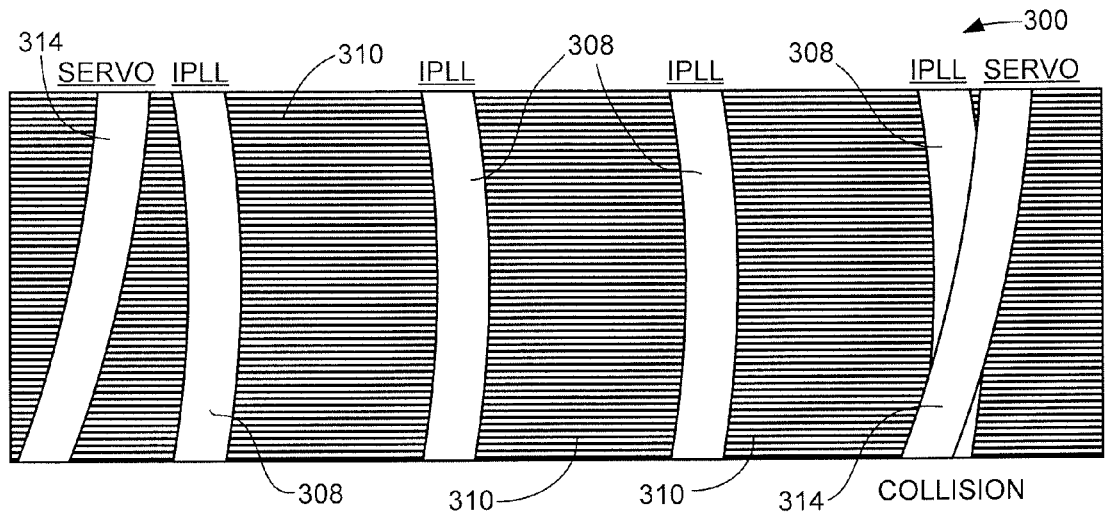
FIG. 13 illustrates a potential collision between timing fields of FIG. 12 and servo fields that extend along a mechanical stroke path.

FIG. 13 shows the timing fields 308 and data fields 310 of the medium 300 of FIG. 12 in conjunction with spaced apart servo fields 314. The servo fields 314 are generally aligned with the mechanical stroke path of the transducer. Because the respective fields 308, 314 follow arcs having different centers, it is possible for pairs of these fields to "collide" at certain angular locations on the medium 300, as generally shown in FIG. 13. Even if such collisions were avoided through relocation of the timing fields 308, non-uniform phase delays would still exist between the servo fields 312 and the timing fields 308 (and data fields 310).

Figure 14A:
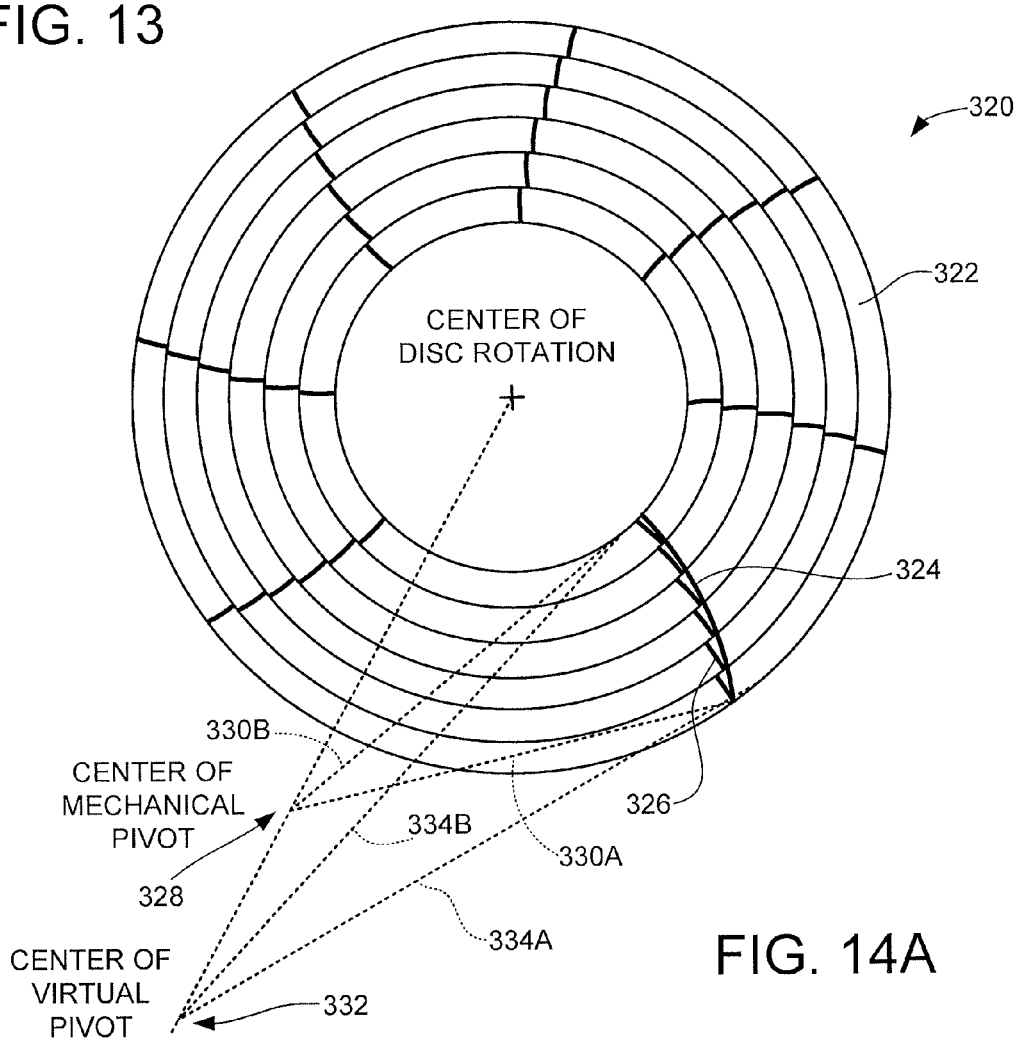
FIGS. 14A-14B depict another storage medium with zone-based, discontinuous timing (e.g., IPLL) fields in accordance with some embodiments.
Figure 14B:
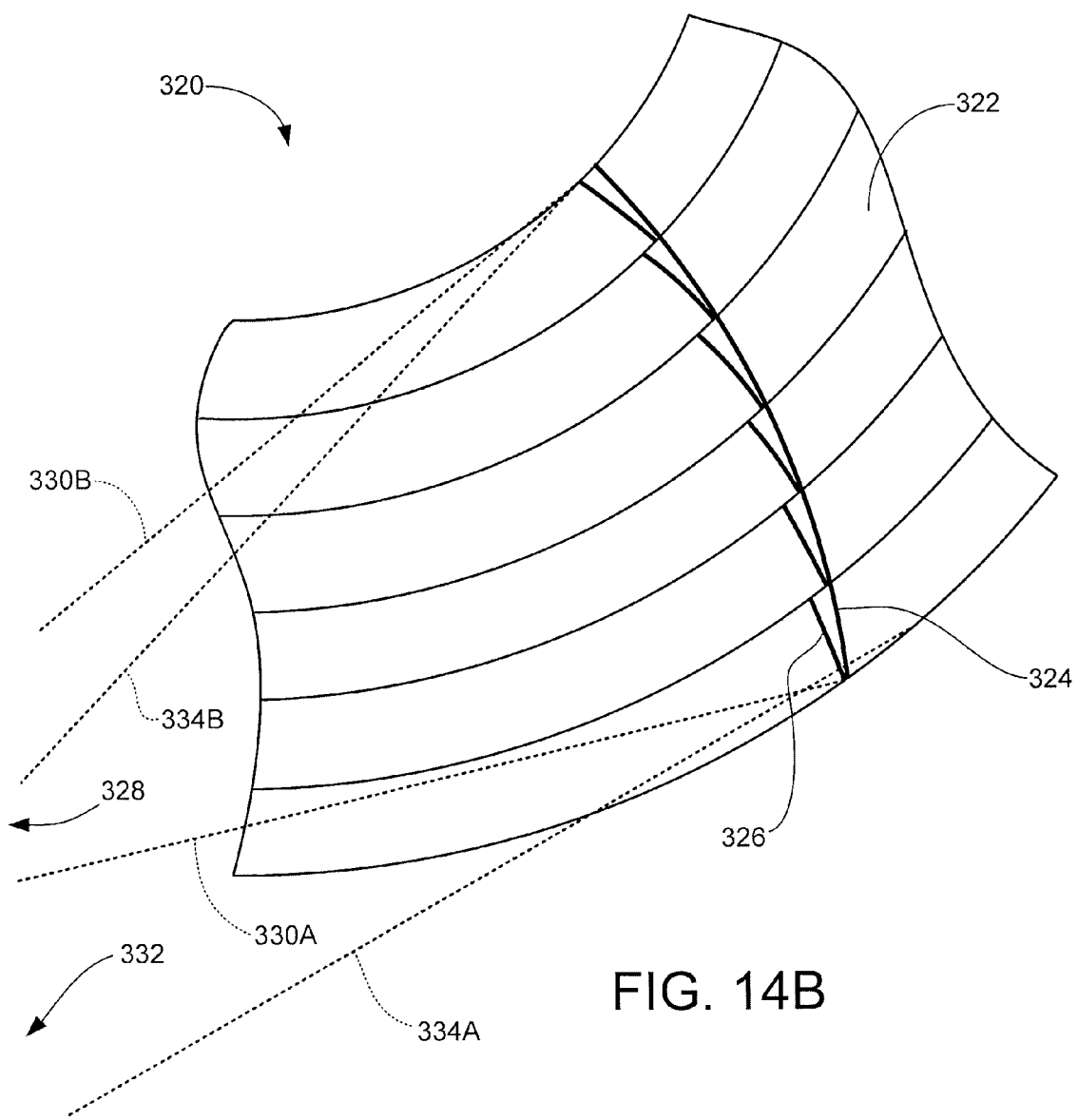

Accordingly, FIG. 14A depicts another patterned medium 320 in accordance with some embodiments. FIG. 14B shows portions of FIG. 14A in greater detail. The medium 320 has a plurality of tracks arranged into concentric zones 322. The tracks are hypertracks formed of rows of dots offset as discussed above to account for transducer skew. The number of tracks in each zone can vary, and all of the tracks in each zone are written at a different selected frequency.

A servo wedge 324 is made up of adjacent servo fields that extend across the radial extent of the medium 320. As discussed above, the servo fields provide positioning information for use by the servo control circuit of the associated data storage device. A plurality of timing field segments are denoted at 326 to provide timing information during read and write operations, as previously noted. The timing fields 326 are discontinuous from one zone 322 to the next. The actual amount of deviation between the timing field segments 326 and the mechanical stroke path 324 will vary and this deviation has been exaggerated somewhat in FIGS. 14A-14B for clarity of illustration.

The servo wedge 324 is nominally aligned with the mechanical stroke path of the system, which is defined by rotation of the actuator (not shown) at the center of a mechanical pivot point 328. For reference, broken lines 330A-330B define the radial extents of the mechanical stroke path. Each of the timing field segments 326 is similarly aligned with the virtual stroke path within each zone 322, which is defined via virtual rotation about the center of a virtual pivot point 332. Broken lines 334A-334B define the radial extents of the virtual stroke path.

The actual number and spacing of the timing field segments can vary. In some cases, a different total number of timing fields is provided in each zone. The timing field segments 326 take a general form such as discussed above in FIG. 12 and are nominally aligned along the virtual stroke path in each zone 322.

Figure 15:
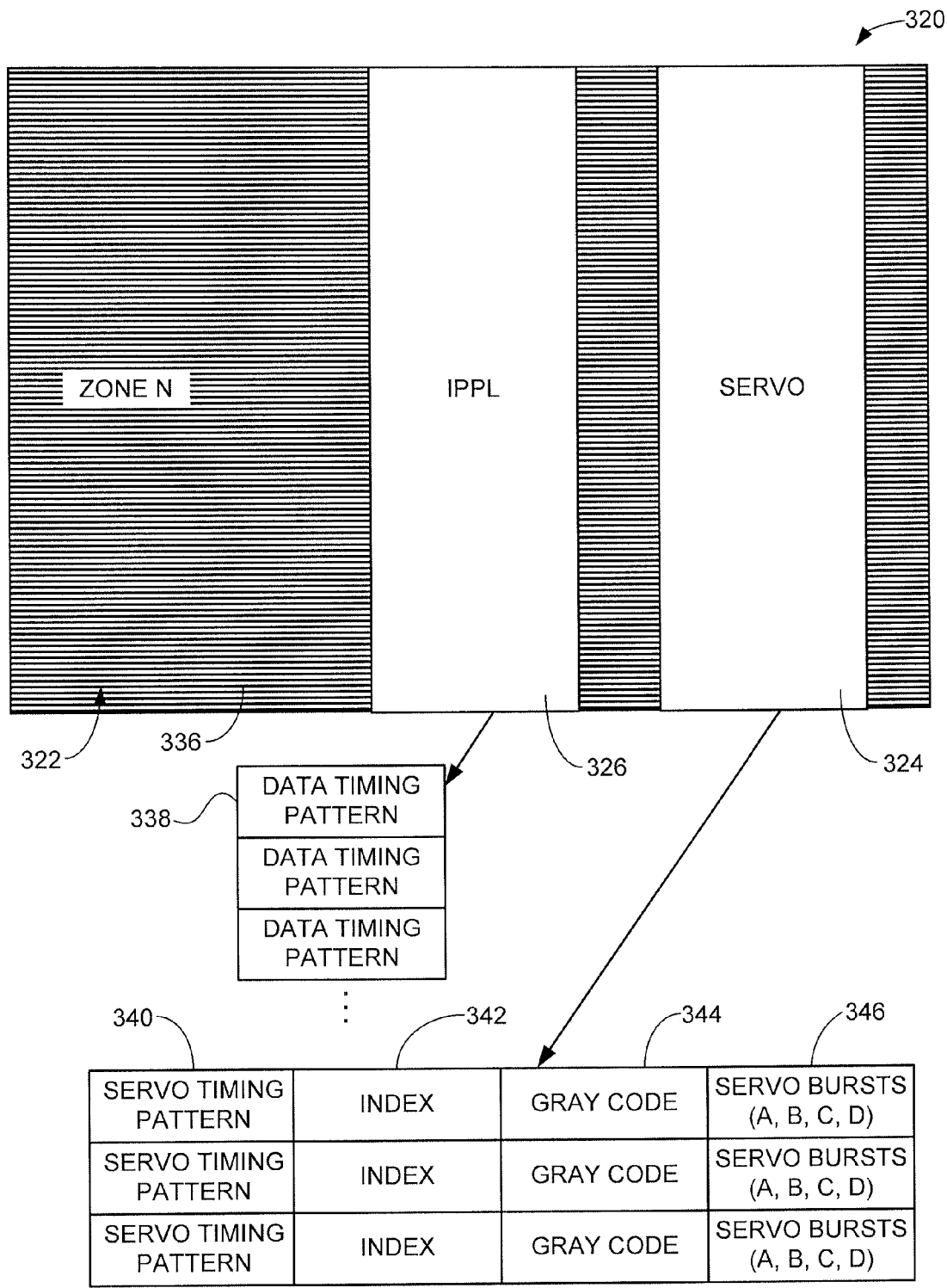
FIG. 15 shows various fields from FIGS. 14A-14B in greater detail.

FIG. 15 is a schematic representation of a portion of the medium 320 of FIGS. 14A-14B for a selected zone 322 (Zone N). A radially extending servo data wedge (pattern) 324 extends across the medium 320 and generally follows the mechanical stroke path of the actuator. A timing field (IPPL) 326 extends proximate the servo data pattern 324 and generally follows the virtual stroke path. It will be noted that both fields 324, 326 are shown in rectilinear fashion for simplicity of illustration. User data fields 336 are provided along the zones 322 in the areas between the timing field segments 326 and the servo data patterns 324.

The timing field segments 326 within each zone are made up of a number of radially aligned timing fields, or data timing patterns 338. The servo data pattern 324 is similarly made up of a number of radially aligned servo fields such as a servo (sync) timing pattern 340, an index (angular position) field 342, a Gray code (track address) field 344 and servo bursts (A, B, C, D) fields 346.

The respective distances along the tracks from the timing fields to the servo data fields will be substantially constant in each zone, although this distance may vary from one zone to the next. Generally, however, the arcuate timing field segments 326 are nominally aligned with the virtual stroke path of the actuator, are angularly discontinuous (e.g., radially continuous and angularly offset) at zone boundaries, and are arranged in a general "stair step" manner to nominally follow the servo wedge 324 which in turn follows the mechanical stroke path of the actuator. In this way, each of the conflicting design criteria identified by the inventors as discussed above can be met.

Figure 16A:
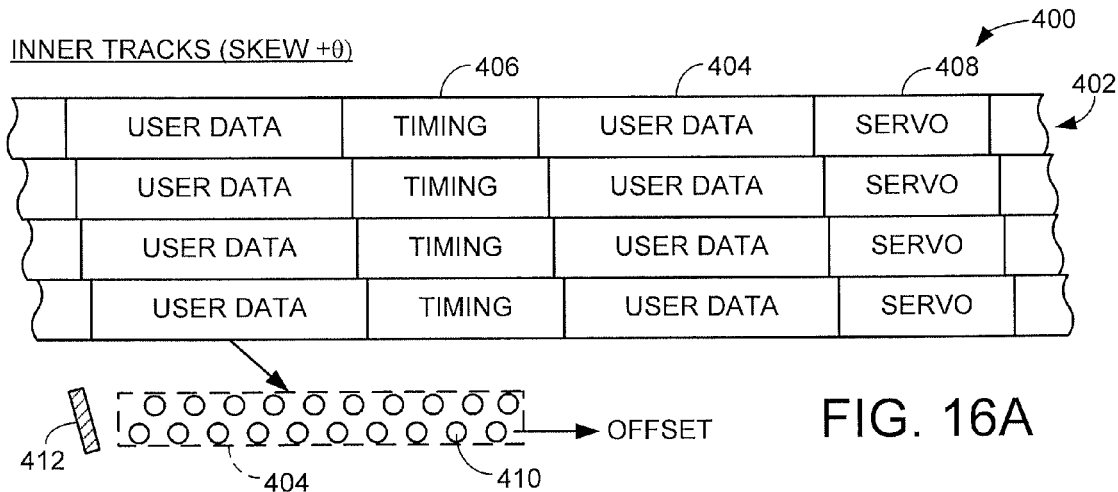
FIGS. 16A-16C depict yet another storage medium having discontinuous timing fields in accordance with various embodiments.
Figure 16B:
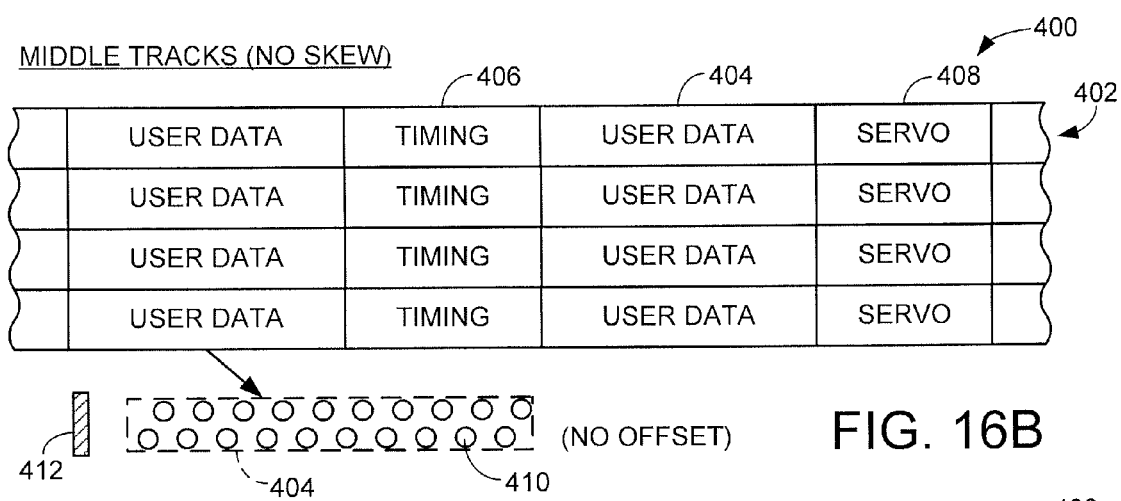
Figure 16C:
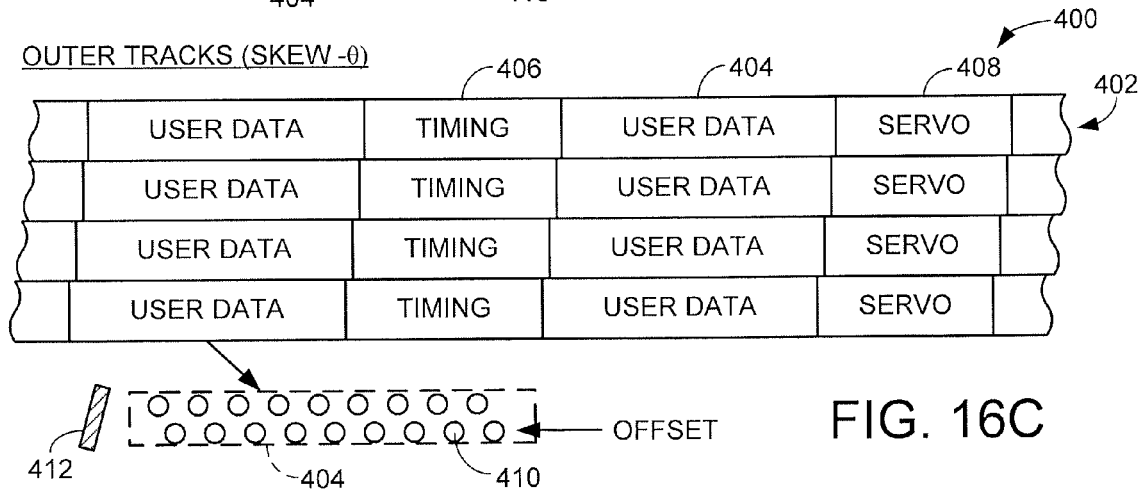

FIGS. 16A-16C represent another patterned medium 400 formatted in accordance with various embodiments to generally summarize the foregoing discussion. It will be understood that the medium 400 is incorporated into a data storage device such as 100 in FIG. 1. The storage device includes an actuator that supports a transducer having read and write elements and which follows a mechanical stroke path across the medium. A suitable twist angle is applied to the transducer to further define a virtual stroke path across the medium.

FIG. 16A generally represents a set of adjacent tracks 402 in a first zone adjacent the innermost diameter (ID) of the medium 400. FIG. 16B provides an additional set of the tracks 402 in a second zone near a middle portion of the medium 400. FIG. 16C provides yet another set of the tracks 402 in a third zone adjacent the outermost diameter (OD) of the medium 400. Any number of additional zones can be provided across the radial width of the medium.

Each of the various tracks 402 includes a number of user data fields 404, a timing pattern 406 and a servo pattern 408. Collectively, the timing patterns 406 in each zone form a timing (e.g., IPPL) field that spans the associated zone and is discontinuous with timing fields in immediately adjacent zones. Similarly, the servo patterns 408 along each track collectively form a portion of a servo field (wedge) that spans the entire medium radius from OD to ID and follows the mechanical stroke path of the adjacent transducer.

Each track 402 is a hypertrack having two (2) rows of data recording dots 410. In the user data fields 404 of FIG. 16A, an offset is applied in a first direction (to the right in FIG. 16A) to each row to account for a selected positive skew ($\alpha=+\theta$) of a read element 412. A similar offset is applied to the timing patterns 406 to maintain phase coherence with the data fields 404. It will be noted that the timing field is nominally parallel with the servo field and therefore nominally follows the mechanical stroke path of the transducer.

The middle tracks 402 in FIG. 16B are subjected to effectively little or no skew from the transducer 412. Accordingly, no row offset is applied to the recording dots 410 in the user data fields 404 and the timing patterns 406. As before, the timing field (group of timing patterns 406) is nominally parallel with the servo wedge (group of servo patterns 408).

The tracks 402 adjacent the outermost diameter (OD) in FIG. 16C are offset in a second direction (to the left in FIG. 16C) to account for a selected negative skew ($\alpha=-\theta$) in the read element 412. As before, the offset is applied to the user data fields 404 and the timing patterns 406. Arranging the medium 400 in this way generally maintains phase coherence between the timing fields and user data in each zone.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An apparatus comprising a transducer and a rotatable substrate having a plurality of hypertracks each comprising multiple offset rows of spaced apart data recording dots, each hypertrack angularly offset along a downtrack direction from an adjacent hypertrack responsive to a skew angle of the transducer and arranged into concentric zones, a first data recording dot of a first hypertrack row not being physically centered between data recording dots of second and third hypertrack rows, each zone having a timing field segment which extends across the zone and is angularly discontinuous with the timing field segment of an immediately adjacent zone.

2. The apparatus of claim 1, wherein each timing field segment is an arcuate segment defined by a virtual stroke path of the transducer rotatable about a virtual pivot point, and wherein the timing field segments are stepped to nominally follow a mechanical stroke path of the transducer rotatable about a mechanical pivot point.

3. The apparatus of claim 2, wherein a first radial distance extends between the virtual pivot point and the virtual stroke path, and a second, shorter radial distance extends between the mechanical pivot point and the mechanical stroke path.

4. The apparatus of claim 3, wherein the substrate further has a servo wedge which extends along and is nominally aligned with the mechanical stroke path.

5. The apparatus of claim 1, further comprising an actuator arm rotatable about a mechanical pivot point adjacent the substrate, the actuator arm supporting the transducer at a distal end thereof, wherein a nonzero twist angle is applied to the transducer as a rotational offset between a longitudinal centerline of the transducer and a longitudinal centerline of the actuator arm.

6. The apparatus of claim 5, wherein the transducer comprises a write element configured to write a bit sequence to the rows of dots and a read sensor configured to sense the written bit sequence, and wherein the twist angle provides a first amount of skew to the write element and read sensor adjacent an innermost diameter of the substrate, provides substantially no skew to the write element and read sensor adjacent a middle portion of the substrate, and provides an opposing second amount of skew to the write element and read sensor adjacent an outermost diameter of the substrate.

7. The apparatus of claim 1, characterized as a self-assembling bit patterned medium.

8. The apparatus of claim 7, wherein the self-assembling bit patterned medium comprises an array of alignment features that direct a self-assembling material to form the rows of dots, wherein the alignment features are angularly offset to provide the angularly offset rows of dots.

9. The apparatus of claim 1, wherein the transducer forms a portion of an actuator assembly rotatable about a mechanical pivot point and comprising an actuator arm which supports the transducer at a distal end thereof, the transducer having respective read and write elements adapted to read data from and write data to the rows of dots, the transducer rotationally offset from a longitudinal centerline of the actuator arm by a selected twist angle.

10. The apparatus of claim 1, wherein the timing field segment comprises adjacent rows of dots that are angularly offset in relation to the angular offsets of the recording dots.

11. An apparatus comprising:
- an actuator assembly rotatable about a mechanical pivot point and comprising an actuator arm which supports a transducer having respective read and write elements, the transducer rotationally offset by a twist angle relative to a longitudinal centerline of the actuator arm which passes through the mechanical pivot point, wherein the twist angle defines a virtual stroke path about a virtual pivot point; and
- a rotatable patterned medium adjacent the actuator assembly and comprising a plurality of hypertracks arranged into concentric zones, each hypertrack formed from at least two immediately adjacent rows of spaced apart data recording dots, each hypertrack being angularly offset from an immediately adjacent hypertrack along a downtrack direction by an amount determined in relation to the twist angle of the transducer and a skew angle of the transducer, a first data recording dot of a first hypertrack row not being physically centered between data recording dots of second and third hypertrack rows.

12. The apparatus of claim 11, wherein each zone comprises an arcuate timing field segment that extends across the radial width of the associated zone to provide timing information to enable the writing of data to, and the reading of data from, the hypertracks using the transducer, each timing field segment having a radius established by the virtual pivot point and aligned with the virtual stroke path, wherein the arcuate timing field segments are discontinuous at zone boundaries and are nominally aligned with a mechanical stroke path of the transducer defined by rotation of the actuator assembly about the mechanical pivot point.

13. The apparatus of claim 11, wherein the medium further comprises spaced-apart servo wedges that extend from an innermost diameter (ID) of the medium to an outermost diameter (OD) of the medium to provide servo control information to position the transducer adjacent the hypertracks, wherein the servo wedges are aligned along a mechanical stroke path of the transducer defined by rotation of the actuator assembly about the mechanical pivot point.

14. The apparatus of claim 11, wherein the patterned medium is characterized as a self-assembled bit patterned medium in which alignment features direct a self-assembling material to form the rows of dots.

15. An apparatus comprising a bit patterned medium having first and second hypertracks each comprising two offset rows of spaced apart data recording dots and angularly offset from immediately adjacent hypertracks along a downtrack direction, a first data recording dot of a first hypertrack row not being physically centered between data recording dots of second and third hypertrack rows, the hypertracks arranged into concentric zones, each zone comprising an arcuate timing field segment to provide timing information for writing data to and reading data from the data recording dots, the timing field segments discontinuous at zone boundaries and arranged to nominally follow a mechanical stroke path of an adjacent transducer.

16. The apparatus of claim 15, wherein each zone comprises a plurality of spaced apart arcuate timing field segments, and wherein the bit patterned medium further comprises a plurality of spaced apart arcuate servo wedges that extend across the medium to provide servo positioning information for the transducer, each arcuate servo wedge aligned with the mechanical stroke path of the transducer.

17. The apparatus of claim 15, wherein the timing field segments are phase coherent with the rows of dots in the associated zones and nominally aligned with the mechanical stroke path of the transducer.

18. The apparatus of claim 16, wherein the medium further comprises a plurality of spaced apart servo wedges comprising servo patterns used to control position of the transducer, wherein each of the servo wedges spans an overall radial width of the medium and is nominally aligned with the mechanical stroke path of the transducer.

19. The apparatus of claim 15, wherein the timing field segments are characterized as interspersed phase lock limited (IPLL) fields.

20. The apparatus of claim 15, wherein the bit patterned medium is a self-assembling medium comprising a plurality of alignment features that direct a self-assembling material to form the rows of spaced apart data recording dots, wherein offsets are applied to the alignment features to provide the corresponding angular offsets of the rows of spaced apart data recording dots.

* * * * *